US008655016B2

(12) United States Patent
Brown et al.

(10) Patent No.: US 8,655,016 B2
(45) Date of Patent: Feb. 18, 2014

(54) EXAMPLE-BASED OBJECT RETRIEVAL FOR VIDEO SURVEILLANCE

(75) Inventors: Lisa M. Brown, Pleasantville, NY (US); Frederik C. M. Kjeldsen, Poughkeepsie, NY (US); Chiao-Fe Shu, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 13/194,032

(22) Filed: Jul. 29, 2011

(65) Prior Publication Data

US 2013/0028468 A1 Jan. 31, 2013

(51) Int. Cl.
*G06K 9/68* (2006.01)
*G06F 17/30* (2006.01)

(52) U.S. Cl.
USPC ........... 382/103; 382/218; 382/305; 348/143; 348/148; 707/772

(58) Field of Classification Search
USPC .......... 382/217, 218, 305, 190, 103; 707/772; 715/968; 348/143, 148, 149
See application file for complete search history.

(56) References Cited

U.S. PATENT DOCUMENTS

| | | | |
|---|---|---|---|
| 6,240,424 B1 * | 5/2001 | Hirata | 707/749 |
| 7,612,813 B2 | 11/2009 | Hunter | |
| 2004/0139470 A1 | 7/2004 | Treharne | |
| 2008/0082426 A1 * | 4/2008 | Gokturk et al. | 705/27 |
| 2008/0187227 A1 * | 8/2008 | Bober et al. | 382/190 |
| 2010/0067741 A1 | 3/2010 | Stolkin et al. | |
| 2010/0306193 A1 * | 12/2010 | Pereira et al. | 707/728 |

FOREIGN PATENT DOCUMENTS

WO WO-2006128124 A2 11/2006

OTHER PUBLICATIONS

Kliot et al. "Invariant-Based Data Model for Image Databases." Proceedings of the International Conference on Image Processing, vol. 2, Oct. 4, 1998, pp. 803-807.*
Sheikh et al. "A Content Based Image Retrieval System for Marine Life Images." IEEE 15th International Symposium on Consumer Electronics, Jun. 14, 2011, pp. 29-33.*
Ravela et al. "Retrieving Images by Similarity of Visual Appearance." Proceeings of the IEEE Workshop on Content-Based Access of Images and Video Libraries, Jun. 20, 1997, pp. 67-74.*
Sakaino, H.; "Moving vehicle velocity estimation from obscure falling snow scenes based on brightness and contrast model"; IEEE/2002 Conf on Image Processing; pp. 905-908; 2002.
Tian, Y.; "Class 3: Advanced Moving Object Detection and Alert Detection"; Video Surveillance vs Automated Analytics; E6998-007; Andrewsenior.com/technical/surveill; Feb. 2008.
Tian,Y.-et al.; "Event detection, query and retrieval for video surveillance"; Artificial Intelligence for Maximizing Content Based Image Retrieval; pp. 342-370; 2009.
Tian, Y.; "IBM Smart Surveillance System"; IBM Exploratory Computer Vision Group, IBM T.J. Watson Research Center; Jan. 2006.

* cited by examiner

*Primary Examiner* — Jon Chang
(74) *Attorney, Agent, or Firm* — Ryan, Mason & Lewis, LLP

(57) ABSTRACT

Methods and apparatus are provided for example-based object retrieval that can retrieve objects from video images in real-time. An object of interest is identified in a sequence of images by obtaining an identification from a user of an example object having at least one attribute of interest; generating a query object based on the identified example object, wherein the query object has a substantially similar viewpoint as objects in the sequence of images and wherein the query object comprises a plurality of attributes that are substantially similar as the example object; and processing the sequence of images to identify the object of interest based on a similarity metric to the query object.

22 Claims, 3 Drawing Sheets

EXAMPLE-BASED OBJECT RETRIEVAL FOR VIDEO SURVEILLANCE

FIELD OF THE INVENTION

The present invention relates generally to video surveillance applications, and more particularly, to improved video surveillance applications that are used to find objects with specified attributes.

BACKGROUND OF THE INVENTION

In video surveillance applications, it is often desirable to retrieve or identify an object of interest, such as a vehicle, from images based on the color of the object. The problem is challenging because objects can have many poses with respect to the camera, and the color of the object as seen from the camera depends on the type of object, lighting conditions, pose, and camera characteristics. Existing color-based retrieval techniques are primarily from the field of content-based image retrieval (CBIR) and typically aim to search image databases for specific images that are similar to a given query image based on matching features derived from the image content. See, for example, M. V. Suhhamani and C.R. Venugopal, "Grouping and Indexing Color Features for Efficient Image Retrieval," World Academy of Science, Engineering and Technology 27 (2007).

Color is often the most significant and distinguishing visual feature for retrieval. A number of techniques have been proposed or suggested for performing color classification of people and vehicles for video surveillance. See, for example, L. M. Brown, "Color Retrieval for Video Surveillance," Advanced Video and Signal Based Surveillance (AVSS), Albuquerque, N. Mex., September 2009, incorporated by reference herein. Generally, objects are first segmented based on background subtraction and tracking. Objects are then classified as one of a predefined set of colors based on their histogram. In L. M. Brown, the histogram is based on an HSL (hue, saturation, and lightness) space and the primary color of the object is determined using a rule-based approach.

This type of color classification can cause a number of problems. The first issue is color constancy. Although people perceive an object to be the same color across a wide range of illumination conditions, the actual pixels of an object may have values that range across the color spectrum depending on the lighting conditions and relative pose. In addition, it may be difficult to accurately segment moving objects from the background. Shadows are often part of the object and errors exist in the segmentation due to the similarity of the object of interest, other objects in the scene and the background model. Further, complex objects may not be predominately one color. Certain aspects of objects are of interest to the human and these depend on the type of object and application.

It is often desirable to specify an object of interest for retrieval by a video surveillance system by identifying a similar object. For example, a user may identify a vehicle of interest by specifying the color, manufacturer and model of the desired vehicle. A need therefore exists for an example-based color retrieval system, where a selected example is employed to restrict alerts of candidate objects to "similar" objects. Among other benefits, an example-based color retrieval system does not require an object to be defined into a single color class. In addition, to the extent that the query and retrieved events occur under similar conditions, the example-based approach can reduce the issues that arise due to lighting variations.

A further need exists for an example-based retrieval system that can retrieve objects in real-time from a specific alarm-based set of events rather than from the set of all tracked objects stored in a database. In this manner, the errors based on segmentation and tracking are significantly reduced (since not all objects need to be tracked) while minimizing the variations due to pose.

SUMMARY OF THE INVENTION

Generally, methods and apparatus are provided for example-based object retrieval that can retrieve objects from video images in real-time. According to one aspect of the invention, an object of interest is identified in a sequence of images by obtaining an identification from a user of an example object having at least one attribute of interest; generating a query object based on the identified example object, wherein the query object has a substantially similar viewpoint as objects in the sequence of images and wherein the query object comprises a plurality of attributes that are substantially similar as the example object; and processing the sequence of images to identify the object of interest based on a similarity metric to the query object.

In various implementations, the query object can be generated by (i) presenting the user with a plurality of potential example objects having a substantially similar viewpoint as objects in the sequence of images; or (ii) translating the identified example object to provide a substantially similar viewpoint as objects in the sequence of images. For example, the example object can be selected from a plurality of images obtained from a camera having a similar viewpoint view as a camera that generates the sequence of images.

In an embodiment where the object of interest is a vehicle, the attributes comprise, for example, a similar color, manufacturer and model as the object of interest. More generally, the attributes can comprise, for example, one or more of similar color, similar pose and similar lighting conditions as the object of interest.

A more complete understanding of the present invention, as well as further features and advantages of the present invention, will be obtained by reference to the following detailed description and drawings.

DETAILED DESCRIPTION OF PREFERRED EMBODIMENTS

The present invention provides an example-based color retrieval system, where a selected example is employed to restrict alerts to similar objects. For example, a user can define the search criteria using an example.

According to a query-by-example aspect of the invention, the user selects an example of an object that is similar to a desired object that should be identified in one or more video sequences. For example, the user may identify a vehicle of interest by selecting an image of a vehicle having a similar color, manufacturer and model as the desired vehicle. In addition, the user can optionally select the object of interest under appropriate lighting conditions. In one implementation, the user can select the example object in a similar pose to the pose that the desired object will have in the processed images. For example, the user can select the example object using images obtained from the same camera that generates the images that will be processed to identify the object of interest, or from a camera having a similar point of view. In this manner, the query specification substantially matches the location, pose and some lighting issues of the search space.

In a further variation, the user can select the example object from a set of images and the disclosed system can automatically obtain a corresponding image of the example object in an appropriate pose from a database, and optionally under similar lighting conditions. For example, the user can specify the color, manufacturer and model of the desired vehicle, and the system can automatically obtain one or more images of the desired vehicle in an appropriate pose for each monitored camera.

According to an alarm-based event detection aspect of the invention, the user selected example is then used to retrieve objects, for example, in real-time, from a specific alarm-based set of events, rather than from the set of all tracked objects stored in a database. In one exemplary implementation, the query example is tested against each alarm at run-time to determine the matching score. Events can then be retrieved in rank order.

Aspects of the present invention are thus based on example-based specification of color and other attributes and real-time alerting. The user selects an example of an object that is similar to a desired object. In addition, the user optionally sets a tripwire or another trigger to detect an object (e.g., a vehicle) crossing a certain virtual location to thereby specify a region of interest. In this manner, the search is restricted to the detection of the selected color class from the same or a similar scenario. This functionality provides accurate retrieval of objects of similar color distributions, because (1) the pose of the object is limited by the tripwire specification, (2) lighting is less variable because of the similar pose, and (3) retrieval costs are minimal because testing is limited to the query-based example.

Figure 1:
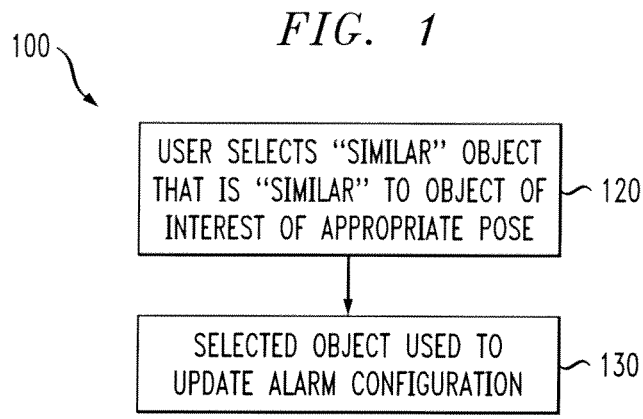
FIG. 1 is a flow chart describing an exemplary query specification process incorporating aspects of the present invention.

FIG. 1 is a flow chart describing an exemplary implementation of a query specification process 100 incorporating aspects of the present invention. As shown in FIG. 1, the user initially selects a "similar" object that is similar to object of interest in an appropriate pose, during step 120. For example, the user can select a similar object from a database of images, or the user can optionally specify the query using keywords. The selection of the similar object in an appropriate pose may be, for example, the similar object in an image from the same or a similar camera. The selected object is used to update the alai in configuration during step 130. For example, the alarm may specify to detect the object of interest in particular region of a sequence of images from one or more cameras.

Figure 2A:
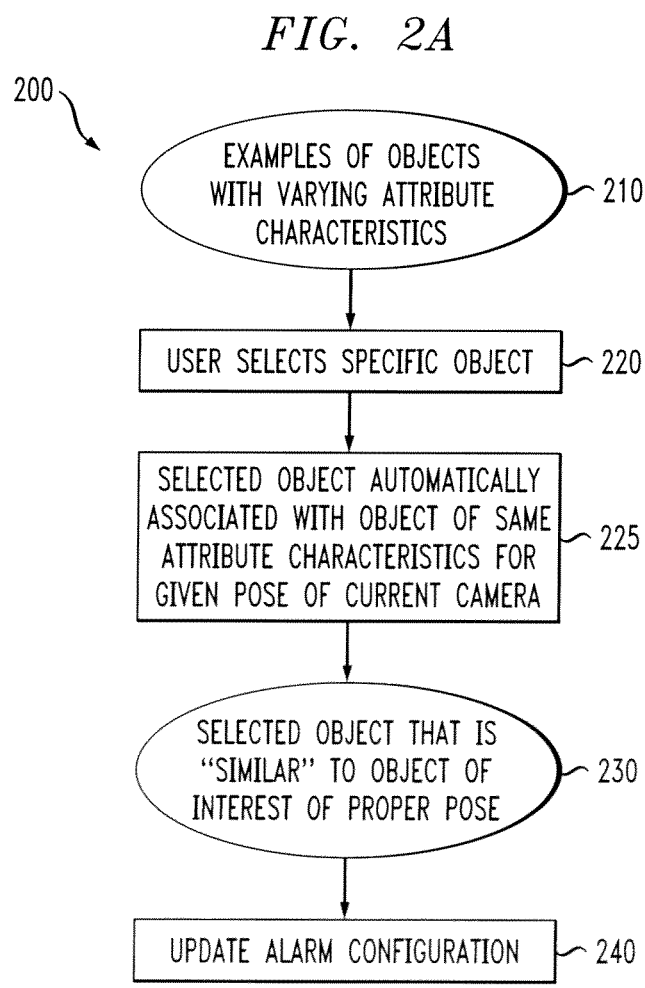
FIG. 2A is a flow chart describing an exemplary implementation of a query specification process incorporating aspects of the present invention.

FIG. 2A is a flow chart describing an exemplary implementation of a query specification process 200 incorporating aspects of the present invention. As shown in FIG. 2A, the user initially selects a specific object during step 220 that is similar to object of interest in an appropriate pose, from a database 210 of object examples with varying attribute characteristics. The selected object is automatically associated an with object having the same attribute characteristics for a given pose of the current camera during step 225. The user can select the example object from the set of images 210 and the query specification process 200 automatically obtains a corresponding image of the example object in an appropriate pose from a database, and optionally under similar lighting conditions. For example, the user can select an image of a vehicle having the desired color, manufacturer and model, and the query specification process 200 can automatically obtain one or more images of the desired vehicle in an appropriate pose for each monitored camera during step 225.

The selected object 230 is "similar" to the object of interest in a proper pose. The selected object 230 is used to update the alarm configuration during step 240. For example, the alarm may specify to detect the object of interest in particular region of a sequence of images from one or more cameras.

Figure 2B:
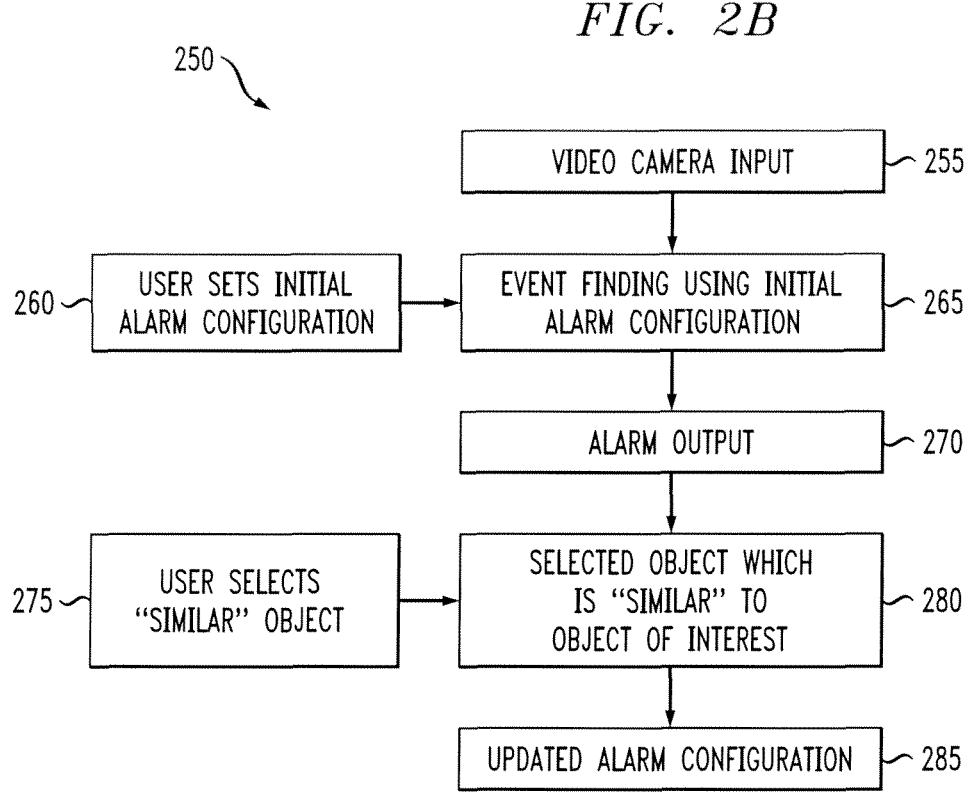
FIG. 2B is a flow chart describing an exemplary alternative implementation of a query specification process incorporating aspects of the present invention.

FIG. 2B is a flow chart describing an exemplary implementation of an alternate query specification process 250 incorporating aspects of the present invention. Generally, the query specification process 250 of FIG. 2B selects an example object from images captured from the same camera that generates the images that will be processed to identify the object of interest. The query specification process 250 of FIG. 2B can also be used to select an example object from images captured from a camera having a similar point of view as the actual camera.

As shown in FIG. 2B, the user initially sets an initial alarm configuration during step 260 to process images from a video camera input 255 or from a historical database of images from the same camera 255. For example, the user can specify a tripwire, motion threshold or otherwise specify a region of interest. Generally, the initial alarm configuration captures images of objects from the same camera, or a camera having a similar point of view. The captured images provide a set of candidate images as an alarm output 270 from which the user can select a similar object to the desired object of interest.

As shown in FIG. 2B, the user selects a specific object 280 during step 275 from the alarm output 270 that is similar to object of interest in an appropriate pose. The selected object 280 is "similar" to the object of interest and in a proper pose (and typically from the same camera). The selected object 280 is used to update the alarm configuration during step 285. For example, the alarm may specify to detect the object of interest in particular region of a sequence of images from one or more cameras. According to one aspect of the invention, the selected object 280 is in the same context where it is applied during real-time monitoring.

Figure 3:
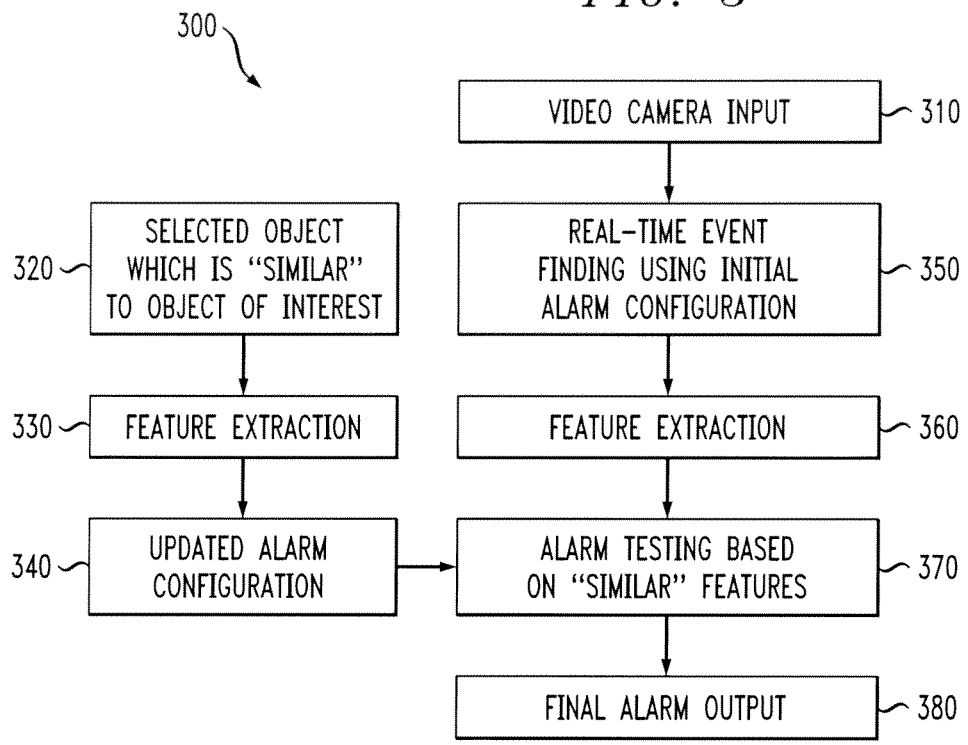
FIG. 3 is a flow chart describing an exemplary implementation of a real-time alarm-based event detection process incorporating aspects of the present invention.

FIG. 3 is a flow chart describing an exemplary implementation of a real-time alarm-based event detection process 300 incorporating aspects of the present invention. As shown in FIG. 3, the exemplary alarm-based event detection process 300 processes the selected object 320 that is "similar" to the object of interest to extract features during step 330. An exemplary set of color features are discussed below in a section entitled "Color Feature Analysis." An updated alarm configuration is established during step 340.

Meanwhile the video images from a video camera 310 are processed during step 350 to perform a real-time event finding process, using the initial alarm configuration.

As shown in FIG. 3, the exemplary alarm-based event detection process 300 processes the images to extract features during step 360. An exemplary set of color features are discussed below in a section entitled "Color Feature Analysis." Alarm testing is performed during step 370 based on "similar" features. An exemplary set of similarlity metrics are discussed below in a section entitled "Distance (Similarity) Metrics." The final alarm output is generated during step 380.

Color Feature Analysis

There are a number of alternative color features that can be employed for query-based vehicle detection. The first feature is the basic RGB histogram with (N×N×N=N³) exemplary bins. The RGB histogram can be made more invariant to lighting changes by normalizing the pixel value distributions.

$$\begin{pmatrix} R' \\ G' \\ B' \end{pmatrix} = \begin{pmatrix} \frac{R - \mu_R}{\sigma_R} \\ \frac{G - \mu_G}{\sigma_G} \\ \frac{B - \mu_B}{\sigma_B} \end{pmatrix}$$

An alternative color feature that can be employed for query-based vehicle detection is the HSV (hue, saturation, and value) color space. The HSV space has several advantages. Since it is perceptually uniform, the distance between colors are more meaningful. Furthermore, it is straightforward to map the samples to human perceived "culture" colors. It has been recognized, however, that the hue becomes unstable around the gray axis.

There are two approaches that can make this more robust. The first is to weigh each sample inversely proportionally to saturation so that as a sample becomes progressively more "gray" the color information is reduced. See, e.g., J. van de Weijer et al., "Boosting Color Saliency in Image Feature Detection," *IEEE Trans. Pattern Analysis and Machine Intelligence* (PAMI), Vol 28, No. 1, 150-156 (2006). The second approach to improve robustness is to create non-uniform bin sizes so that pixels that cannot be distinguished are not arbitrarily put in different bins. See, e.g., Z. Lei et al., "A CBIR Method Based on Color-Spatial Feature," *Proc. IEEE Region 10 Annual International Conference* 1999 (*TENCON'99*), Cheju, Korea, 166-169 (1999). It is noted that intensity information has a different value when indexing since it is not invariant to lighting conditions. However, many vehicle images do not have any significant color information.

A third color feature that can be employed for query-based vehicle detection, referred to herein as "color split," is based on splitting the HSV space into chromatic and achromatic information. The approach has two stages. In the first stage, images are classified based on whether or not they contain significant color information. In the second stage, gray histograms are computed for achromatic images and hue histograms are computed for chromatic images. This approach is based on segmenting HSV space along an intensity/saturation curve. For a more detailed discussion, see L. M. Brown, "Color Retrieval for Video Surveillance," referenced above.

Another alternative color feature that can be employed for query-based vehicle detection is based on the color correlograms. See, e.g., J. Huang. et al., "Image Indexing Using Color Correlograms," *Proc. of the* 1997 *Conf. on Computer Vision and Pattern Recognition*, 762-768 (1997). Color correlograms can be used with different color spaces and a different number of distances between pixels.

Distance (Similarity) Metrics

To compute the ranking for each image in the database against the query image, a distance metric is needed to compute the similarity between examples. Metrics are typically $L_1$ or $L_2$. $L_1$ metrics include absolute difference or histogram intersection. The histogram intersection can optionally be made faster by employing an incremental method of Swain.

See, M. J. Swain, D. H. Ballard, "Color Indexing," *Int'l J. of Computer Vision*, Vol 7, No. 1, 11-32 (1991).

Alternative metrics include the average color distance and quadratic measures. See, e.g., J. Hafner et al. "Efficient Color Histogram Indexing for Quadratic Form Distance Functions," *IEEE Trans. On Pattern Analysis and Machine Intelligence*, Vol. 17, No. 7, 729-736 (1995).

N. Sebe and M. S. Lew, "Robust Color Indexing," Proc. of the Seventh ACM Int'l Conf. on Multimedia (Part 1), Orlando Fla., 239-242 (1999), introduces a new metric based on a maximum likelihood assuming classified training data. In practice, it has been found that $L_1$ performs better than $L_2$ because it is more robust to outliers. It can optionally be further improved by weighting the absolute difference by the sum of the size of the histogram elements so that the metric is a relative difference measure. For color correlogram, an absolute difference can be employed.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 4:
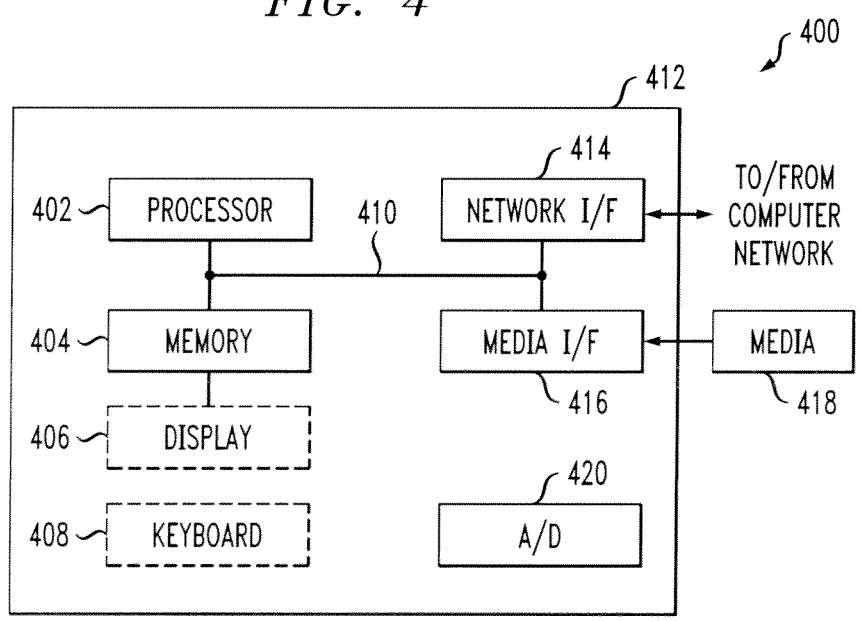
FIG. 4 depicts a computer system that may be useful in implementing one or more aspects and/or elements of the present invention.

One or more embodiments can make use of software running on a general purpose computer or workstation. FIG. 4 depicts an exemplary computer system 400 that may be useful in implementing one or more aspects and/or elements of the present invention. With reference to FIG. 4, such an implementation might employ, for example, a processor 402, a memory 404, and an input/output interface formed, for example, by a display 406 and a keyboard 408.

The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like.

In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Analog-to-digital converter(s) 420 may be provided to receive analog input, such as analog video feed, and to digitize same. Such converter(s) may be interconnected with system bus 410.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 402. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The technology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for identifying an object of interest in a sequence of images, comprising:
    obtaining an identification from a user of an example object having at least one attribute of interest;
    generating a query object based on said identified example object, wherein said query object has a substantially similar viewpoint as objects in said sequence of images and wherein said query object comprises a plurality of attributes that are substantially similar as said example object, wherein said generating step further comprises the step of translating said identified example object to provide a substantially similar viewpoint as objects in said sequence of images; and
    processing said sequence of images to identify said object of interest based on a similarity metric to said query object.

2. The method of claim 1, wherein said generating step further comprises the step of presenting said user with a plurality of potential example objects having a substantially similar viewpoint as objects in said sequence of images.

3. The method of claim 1, wherein said example object is selected from a plurality of images.

4. The method of claim 1, wherein said example object is selected from a plurality of images obtained from a same camera as said sequence of images.

5. The method of claim 1, wherein said example object is selected from a plurality of images obtained from a camera having a similar viewpoint view as a camera that generates said sequence of images.

6. The method of claim 1, further comprising the step of automatically obtaining a corresponding image of the example object in an appropriate pose for said sequence of images.

7. The method of claim 1, wherein said attributes comprise a similar color.

8. The method of claim 1, wherein said object of interest is a vehicle and wherein said attributes comprise a similar color, manufacturer and model as said object of interest.

9. The method of claim 1, wherein said attributes comprise a similar pose as said object of interest.

10. The method of claim 1, wherein said attributes comprise similar lighting conditions as said object of interest.

11. The method of claim 1, wherein said processing step further comprises the step of identifying one or more alarm-based set of events.

12. The method of claim 1, wherein said processing step further comprises the step of testing said example object against at least one alarm at run-time to determine a matching score.

13. The method of claim 1, further comprising the step of receiving a tripwire specification from a user.

14. An apparatus identifying an object of interest in a sequence of images, the apparatus comprising:
    a memory; and
    at least one hardware device, coupled to the memory, operative to:
    obtain an identification from a user of an example object having at least one attribute of interest;
    generate a query object based on said identified example object, wherein said query object has a substantially similar viewpoint as objects in said sequence of images and wherein said query object comprises a plurality of attributes that are substantially similar as said example object, wherein said query object is generated by translating said identified example object to provide a substantially similar viewpoint as objects in said sequence of images; and process said sequence of images to identify said object of interest based on a similarity metric to said query object.

15. The apparatus of claim 14, wherein said query object is generated by presenting said user with a plurality of potential example objects having a substantially similar viewpoint as objects in said sequence of images.

16. The apparatus of claim 14, wherein said example object is selected from a plurality of images obtained from a camera having a similar viewpoint view as a camera that generates said sequence of images.

17. The apparatus of claim 14, wherein said object of interest is a vehicle and wherein said attributes comprise a similar color, manufacturer and model as said object of interest.

18. The apparatus of claim 14, wherein said attributes comprise one or more of similar color, a similar pose and similar lighting conditions as said object of interest.

19. The apparatus of claim 14, wherein said at least one hardware device is further configured to identify one or more alarm-based set of events.

20. The apparatus of claim 14, wherein said at least one hardware device is further configured to test said example object against at least one alarm at run-time to determine a matching score.

21. The apparatus of claim 14, wherein said at least one hardware device is one or more of an integrated circuit, a digital signal processor, a microprocessor, a micro-controller, and a general-purpose computer.

22. An article of manufacture identifying an object of interest in a sequence of images, comprising a non-transitory tangible machine readable recordable medium containing one or more programs which when executed implement the steps of:

obtaining an identification from a user of an example object having at least one attribute of interest;

generating a query object based on said identified example object, wherein said query object has a substantially similar viewpoint as objects in said sequence of images and wherein said query object comprises a plurality of attributes that are substantially similar as said example object, wherein said generating step further comprises the step of translating said identified example object to provide a substantially similar viewpoint as objects in said sequence of images; and processing said sequence of images to identify said object of interest based on a similarity metric to said query object.

* * * * *